Patented Feb. 1, 1944

2,340,338

UNITED STATES PATENT OFFICE 2,340,338

COATING COMPOSITION

John D. Murray, Chicago, Ill.

No Drawing. Application September 23, 1939, Serial No. 296,294

9 Claims. (Cl. 106—210)

The present invention relates to plastic coating compositions containing esters derived from materials from the group consisting of dextrin, starch and the like and is more particularly concerned with providing compositions of this nature which are suitable for the manufacture of clear, colorless, tough films, and thermoplastic coatings for the surfaces of sheets of paper, fabric or the like.

It has hitherto been proposed to provide paper surfaces with protective coatings of resinous material, dissolved cellulose lacquers or wax containing material or the like; but prior to the present invention there has been no commercially available coating composition containing an acetate derived from cellulose, starch or the like which can be thermoplastically applied to the surface of a sheet of paper or the like and having the qualities needed for wide commercial application.

Commercially feasible thermosplastic coating compositions for paper should be inexpensive, quickly and easily manufactured, and should be workable at temperatures above the point required to give a true solution of the composition and below temperatures sufficiently high to injure the paper surface to be coated at the coating speed. At coating speeds of 250 feet per minute, compositions workable at 270° F. are giving excellent results on light papers. At higher speeds or with heavier papers, higher temperatures may be used without substantial injury to the paper. The preferred range of workable temperatures in practice for my improved paper coating compositions is from approximately 240° F. to 300° F. The surfaces must not "block" or stick to like surfaces at temperatures of 140° F. or lower so that the coated paper can withstand shipping, packing and other handling temperatures. The composition should be nontoxis and should have a relatively low viscosity, but yet should be smoothly, evenly and controllably runable over the paper surface during the coating operation. The composition, when solidified, should be stable and closely bonded to the paper surface. It should not crack or peel and should be resistant to the action of the elements including humidity, light and the like, greases, oils and food substances with which it is placed in contact. Further, the cmposition should provide a thin, tough, flexible water-proof coating, which is preferably transparent and easily tinted to a desired color; and preferably the coating should impart a high glossy finish to the paper surface.

With the above in mind, it is a major object of the present invention to provide a novel coating composition containing a low viscosity ester drived from a carbohydrate from the group comprising starch, dextrin and the like having the above-listed desirable properties.

Another object of the invention is to provide a novel thermoplastic coating composition of which more than half is an acetate derived from a material selected from the group comprising starch, dextrin and the like.

A further object of the invention is to provide a novel thermoplastic composition suitable for the manufacture of clear, colorless films, and for coating sheets of paper or the like, embodying an acetate derived from a material selected from the group consisting of starch, dextrin and the like.

Still another object of the invention is to provide a novel thermoplastic composition for coating sheets of paper or the like, and useful as a thermoplastic adhesive, embodying an acetate derived from a material selected from the group consisting of starch, dextrin and the like and possessing low viscosity when melted so as to be freely and uniformly runable over the surface to be coated at temperatures well below those which cause injury to the surface to be coated.

Still another object of the invention is to provide a novel thermoplastic coating composition embodying a dextrin or starch acetate product which gives a thin, tough, transparent film insoluble in grease or food substances and stable enough to resist the action of humidity, light and normal handling temperatures.

A still further object of the invention is to provide a novel thermoplastic coating composition embodying an acetate derived from a material selected from the group consisting of starch, dextrin and the like in a solution having balanced proportions of active and latent solvents and diluents which insure that the composition will be smooth and runable at the temperatures below 300° F. and preferably in the range of 240° F. to 260° F., and will not block at temperatures up to 140° F.

Further objects of the invention will presently appear as the description of the invention proceeds in connection with the appended claims.

My improved coating compositions preferably comprise at least four types of ingredients; first, a base material such as an ester, an ether or a highly polymerized material, or mixtures thereof; second, an active solvent or combination of active solvents; third, a latent solvent which is compatible with the active solvent and, while not a direct solvent for the base material at normal temperatures, forms in connection with the active solvent a solvent mixture at elevated temperatures only; and fourth, a diluent to promote runability at temperatures of application, and to prevent "blocking" at normal handling temperatures. In some applications the same substance may serve as a latent solvent and diluent. By restricting active solvents and proper balancing of latent solvents and diluents, compositions runable at the applying temperatures are provided in which the "blocking" temperatures, or the point at which the surface of the material will stick to itself, may be controlled. At normal temperatures the mixture of ingredients must be such as to form with the acetates and solvents a homogeneous composition. Unless properly balanced, sweating and crystallizing out of one or more ingredients may occur.

My improved coating compositions hereinafter disclosed comprise mainly acetone soluble acetates derived from a material selected from the group consisting of starch, dextrin, cellulose and the like, having workable characteristics.

Preferred esters comprising the coating base material are acetone soluble primary acetates derived from starch or dextrin by special novel processes described below and claimed in my copending application Serial No. 411,745, filed September 20, 1941.

In these processes generally, starch or dextrin having moisture contents above 5 per cent and preferably in the range of 7 per cent to 12 per cent are utilized. Other things being equal, I have found that the lowest viscosity and most useful acetates are produced when the starch or dextrin has an initial moisture content of 7 per cent or more, and the most economical results are secured with moisture contents in the range of 7 to 12 per cent. A sharp difference in solubility and viscosity of the ester product results when initial moisture contents of less than approximately 5 per cent are used. The moisture present reacts with acetic anhydride to form acetic acid in proportions beneficial to the reactions. If necessary I wet the carbohydrate to bring the moisture up to the desired point, or add sufficient acetic acid to make up for the moisture deficiency. However, the normal moisture content of commercially available starches lies in this range. Corn starch, laundry starch, potato starch, tapioca starch, wheat flour starch, potato dextrin, rice starch are exemplary of materials which may be employed.

In my improved processes, the melting points and viscosity of the resulting esters are controllable within limits by the amount of catalyst employed. The acetic acid content is governed by the relative proportions of starch or dextrin (figured on dry basis) and anhydride used.

As a first step in carrying out a preferred embodiment of my invention, a measured quantity of acetic anhydride catalyzed by the addition of from less than 0.1 per cent to about 1 per cent sulfuric acid by weight is placed in a suitable container; and then a measured quantity of a selected starch or dextrin is mixed in the container, the quantity being such that the reaction temperature, after initiation of the reaction, will not substantially exceed the boiling point of the acetic acid in the mixture at prevailing atmospheric conditions. The measured quantities of starch or dextrin and anhydride are permitted to react until the reaction temperatures commence to drop. This acetylation step may be carried out relatively rapidly, usually in a few minutes depending on the quantities involved.

The next step comprises gradually adding, to the reaction product so formed, a measured quantity of acetic anhydride catalyzed by the addition of about 0.12 per cent to 1 per cent sulfuric acid, predetermined in quantity to form the desired acetate. The catalyzed anhydride is added at such a rate as to again keep the reaction temperature relatively high, preferably close to, but not exceeding the boiling point of acetic acid. This step is rather critical. It can be carried out in as little as twenty minutes using laboratory proportions of ingredients, but in commercial quantities the procedure must be slower. For safe commercial operation two to three hours is desirable in producing large sized batches.

The amount of anhydride added is selected according to the nature of the acetate desired to be produced. Using the process of the invention the added anhydride can be computed on approximately the theoretic yield bases to produce diacetates, triacetates, tetra-acetates, etc., as desired, and according to the use for which it is intended. This is not possible with the prior commercial processes, since in all of these the actual yields are materially less than the theoretic yields that may be produced from the reacted ingredients.

The high reaction temperatures and the technique employed enables the process to be carried out using from $\frac{1}{7}$ to $\frac{1}{100}$ of the amount of sulfuric acid used as a catalyzer in commercial prior art processes of cellulose acetates, and as a result, my improved products are not appreciably degraded or discolored in the manner that occurs when such prior art processes are carried out at high temperatures. Due to the high reaction temperatures, however, care must be taken to employ accurately predetermined quantities of sulfuric acid, and to avoid exceeding the boiling point of the acetic acid in carrying the reaction forward. The addition of too much catalyst or mixing the ingredients at such a rate as to exceed the boiling point of acetic acid in the mixture makes the reaction uncontrollable.

By varying the amount of sulfuric acid catalyst utilized in my improved process, acetates having different characteristics may be obtained. For example, in acetylating starch, using sulfuric acid equal to about 0.15 per cent by weight of the anhydride, the acetate produced was a fine white powder of low viscosity, was tasteless and had a melting point between 284° F. and 302° F. By raising the sulfuric acid content to about 0.425 per cent of the anhydride, the acetate was discolored, slightly bitter in taste, and had a melting point of about 230° F. and a viscosity slightly lower than the acetate produced by using the .15 per cent sulfuric acid. Using more than 1 per cent sulfuric acid, the acetate becomes discolored and degraded by the action of the sulfuric acid. By varying the sulfuric content in the second stage or step of the reaction the melting points may be varied.

Other available acetylating agents are acetic acid and acetyl chloride, and other available catalysts are zinc chloride, sulfuryl chloride and chloro sulphonic acid.

Specific examples of desirable commercial practices embodying my novel process will now be described.

The viscosity measurements hereinafter referred to are not absolute but are relative, and are indicated by the time of fall of a 50 gram weight through 44 inches of fall using a Cenco torsion type viscosimeter.

Acetylation products

*Example I.*—In commercial practice one hundred and fifty pounds of acetic anhydride catalyzed by the addition of 2¼ ounces (.093 per cent) of sulfuric acid, Baumé 66°, is placed in a 300 gallon glass-lined or other suitable tank, equipped with a reflux condenser and an agitating device. Then 150 pounds of commercial corn starch having moisture content of 10.8 per cent $H_2O$ is added to the agitated anhydride and thoroughly mixed. With normal room temperatures the reaction starts immediately, and being exothermic the temperature of mass reaches approximately 240° F. to 250° F. in relatively short time.

When the above-described initial reaction stage is substantially complete, as evidenced by a slight drop in temperature of the mixture, further acetylation can be instituted. This further acetylation in practice is preferably instituted when the mass reaches a temperature of about 235° F. In this stage about 169 pounds of acetic anhydride catalyzed by the addition of 3¾ ounces (.14 per cent) of 66° Bé. sulfuric acid is gradually bled into the mixture at such a rate as to maintain a reaction temperature range of approximately from 170° F. to 245° F., and preferably about 235° F. The feeding of the catalyzed anhydride in this stage may be accurately controlled by automatic thermally controlled feeding mechanism.

This latter quantity of anhydride may be varied somewhat according to the water content of the starch employed. The lower the starch water content, the less anhydride need be employed.

This stage of reaction requires about an hour for completion. Its completion is evidenced by a drop in temperature of the mixture which occurs a few minutes after the catalyzed anhydride has been completely added.

The reacted mixture is now allowed to stand for about half an hour at which time it is clear and homogeneous, and the temperature has dropped to a point where the product can be precipitated without substantial generation of obnoxious fumes. At this stage the mixture comprises acetylation derivative of starch in solution in acetic acid, from which the acetate may be precipitated by combination of the mixture with a large volume (about 8 to 1) of cold water.

The acetate precipitate is filtered out, thoroughly washed to remove all traces of acid, and then dried by suitable apparatus.

About 220 pounds of stable acetate in the form of a fine substantially white powder is obtained in the above process. This acetate has a high combined acetic acid content of about 65 per cent, is soluble in acetone, and substantially insoluble in water, grease and oils, has a melting point of approximately 295° F. to 305° F., gives solutions of low viscosity, and may be used to form clear, colorless films and coatings in the manner set forth herein. The viscosity of this acetate measured in a 12½ per cent solution in 90% acetone and 10% alcohol at room temperature in the above-described Cenco Viscosimeter was about 0.8 second. It is admirably adapted for use in thermoplastic compositions for coating paper or the like.

The above-described process may be completed in about two and one-half hours or less, depending upon room temperatures and other factors, so that the output of acetone soluble commercially usable acetate from a factory employing the processes of the invention is many times that possible in the prior art using the same equipment and conditions for the production of cellulose acetates.

By increasing the catalyst in the second stage of the foregoing example from 0.14 per cent to 0.28 per cent by weight of the anhydride, the melting point of the acetate produced is reduced by approximately 50° F.

*Example II.*—When a very low melting point acetate is desired, zinc chloride may be used as a catalyst. Keeping the above proportions of starch and anhydride the same and using 16¾ pounds of zinc chloride, initially mixed with the acetic anhydride as catalyst, the acetate product has a melting point of about 237° F. and combined acetic acid content of 65 per cent. By varying the amount of zinc chloride, the melting point of the final acetate can be varied between wide limits; and, in general, the greater the amount of zinc chloride the lower the melting point.

Further examples illustrative of the scope of the invention with regard to the available ingredients and their relative proportions which may be employed in the process will now be given. In each instance, all of the starch or dextrin and enough (approximately one-half) of the catalyzed anhydride are initially mixed as explained above, in the initial reaction stage; and then the remainder of the catalyzed anhydride is gradually added to complete the reaction, also as above-described. Throughout, the reactions are speeded by maintaining temperatures just below the boiling point of acetic acid.

*Example III.*—100 pounds of corn starch having a moisture content of 10 per cent water is combined with a total of 220 pounds of acetic anhydride catalyzed with four ounces of sulfuric acid. This reaction yields about 148-150 pounds of an acetone soluble acetylation product of starch having a combined acetic acid content of 60–62 per cent and a melting point of 285° F.–300° F. The viscosity at 200° F. of a 33⅓ per cent solution of this acetate in dimethoxy ethyl phthalate (Methox), as measured in the Cenco meter as above-described, is about 5.5 seconds.

*Example IV.*—6 ounces of laundry starch having a moisture content of 12.5 per cent water is combined with a total of 13.5 ounces of acetic anhydride catalyzed with 0.14 per cent of sulfuric acid. This reaction yields about 9 ounces of an acetone soluble acetylation product of starch having a combined acetic acid content of 62.2 per cent and a melting point of 305° F.–325° F. The viscosity at 200° F. of a 33⅓ per cent solution of this acetate in dimethoxy ethyl phthalate, (Methox) as measured in the Cenco meter above-described is about 16.5 seconds. This acetate is used in a coating composition known in the trade as "Liquafilm B–6."

*Example V.*—6 ounces of potato starch having a moisture content of 12.5 per cent water is combined with a total of 13.5 ounces of acetic anhydride catalyzed with 0.14% of sulfuric acid. This reaction yields about 9 ounces of an acetone soluble acetylation product of starch having a combined acetic acid content of 55.6 per cent and a melting point of 320°F.–335° F. The viscosity at 200° F. of a 33⅓ per cent solution of this acetate in dimethoxy ethyl phthalate (Methox), as measured in the Cenco meter above-described is about 17.5 seconds. This acetate is used in a coating composition known in the trade as "Liquafilm B–7."

*Example VI.*—6 ounces of tapioca flour having a moisture content of 13.4 per cent water is combined with a total of 13.25 ounces of acetic anhydride catalyzed with 0.15 per cent of sulfuric acid. This reaction yields about 9 ounces of an acetone soluble acetylation product of starch having a combined acetic acid content of 61.3 per cent and a melting point of 295° F.–310° F. The viscosity at 200° F. of a 33⅓ per cent solution of this acetate in dimethoxy ethyl phthalate (Methox), as measured in the Cenco meter above-described is about 3.5 seconds. This acetate is used in a coating composition known in the trade as "Liquafilm B–3."

*Example VII.*—6 ounces of tapioca flour having a moisture content of 12.5 per cent water is combined with a total of 13.5 ounces of acetic anhydride catalyzed with 0.094 per cent of sulfuric acid. This reaction yields about 9 ounces of an acetone soluble acetylation product of starch having a combined acetic acid content of 61.5 per cent and a melting point of 290° F.–315° F. The viscosity at 200° F. of a 33⅓ per cent solution of this acetate in dimethoxy ethyl phthalate (Methox), as measured in the Cenco meter above-described is about 3.9 seconds. This acetate is used in a coating composition known in the trade as "Liquafilm B–8".

*Example VIII.*—6 ounces of corn starch having a moisture content of 12.5 per cent water is combined with a total of 13½ ounces of acetic anhydride catalyzed by about 0.14 per cent of sulfuric acid. This reaction yields about 9 ounces of an acetone soluble acetylation product of starch which has a combined acetic acid content of 65.6% and a melting point of approximately 273° F. to 295° F. The viscocity at 200° F. of a 33⅓ per cent solution of this acetate in Methox, as measured in the Cenco Viscosimeter above-described, is about 2.5 seconds. This acetate is used in a coating composition known in the trade as "Liquafilm B–9."

The quantities given in the examples above are satisfactory for a moisture content of from 7 per cent to 12 per cent moisture content, but, with less than 7 per cent moisture, the anhydride should be decreased 6 pounds for each pound deficiency of water and the amount of catalyst should be increased slightly.

The process is also applicable to the production of primary acetone soluble acetates of low viscosity directly from starch which is bone dry or of very low moisture content by the addition of moisture directly, or indirectly through the use of acetic acid as explained below. In a preferred manner of manufacturing acetates according to this phase, ingredients in the following proportions are utilized:

*Example IX.*—5¼ ounces of corn starch (bone dry) are combined with 4½ ounces of acetic acid and 9 ounces of acetic anhydride catalyzed by the addition of 0.14% of sulfuric acid. This reaction yields about 9 ounces of an acetone soluble acetylation product of starch having a combined acetic acid content of 64.8% and a melting point of 287° F.–305° F. The viscosity of a 33⅓% solution of this acetate in Methox, as measured in the Cenco Viscosimeter above-described, is about 3.5 seconds at 200° F. This acetate is used in a coating composition known in the trade as "Liquafilm B–10."

It will be noted that while all of the starches given in the foregoing examples react to form useful products, the acetates produced are not interchangeable, but their properties differ depending on the starch used.

The manufacturing procedure followed in the above examples is substantially the same as above-described for the preferred embodiment, care being taken that the reaction temperatures are high enough to proceed rapidly but held below the boiling point of acetic acid.

Dextrin acetate

*Example X.*—In manufacturing a dextrin acetate in accordance with my invention suitable for use in a thermoplastic coating composition known by the trade name of Liquafilm B–4, ingredients in the following proportions are employed: 6 ounces potato dextrin (10% $H_2O$), 13.25 ounces acetic anhydride, and 0.15% $H_2SO_4$.

This reaction is carried out in the manner above-described for the acetylation of starch and yields about 9 ounces of dextrin acetate powder. This acetate has a combined acetic acid content of 63.3 per cent and a melting point of 278° F.–288° F. A 33⅓ per cent solution of this acetate in Methox at 200° F., as measured using the Cenco Viscosimeter above-described, has a viscosity of about 2.5 seconds.

Summary of novel features

In general, all of the acetates of the present invention give solutions of relatively low viscosity. Most of the acetates produced by the process of the present invention have melting points ranging between 245° F. and 325° F., although they may range between 237° F. and 335° F.

The acetates produced by the processes of the invention are moreover high grade, clear and substantially colorless in films and coatings, and substantially insoluble in water, greases and oils, so that they are especially suitable for thermoplastic coating positions for paper or the like.

The following table illustrates the wide difference between the properties of applicant's commercial product produced in accordance with Example I, and the only readily available commercial starch acetate that applicant could find, which is sold as Niacet starch acetate:

|  | Niacet starch acetate | Applicant's acetylation product of starch |
|---|---|---|
| Melting point ° F. | 350 to 365 | 290 to 305 |
| Combined acetic acid content per cent | 57 | 65 |
| Viscosity seconds | 6.8 | 0.8 |

The viscosities in the foregoing tabulation were measured in a Cenco viscosimeter above-described using 12½ per cent solution of the acetate in 90% of acetone and 10% of alcohol at room temperature.

My processes produce for the first time primary acetone soluble acetates in about two hours commercially, as compared with forty-eight hours or more required by the processes to produce primary acetates insoluble in acetone which then must be hydrolyzed to produce secondary acetone soluble acetates.

I have found that esters having from 60 to 65 per cent or more acetic acid content are desirable for paper coating compositions, and the lower the melting point of the ester, the more freely soluble it is in solvent plasticizers or the like. Therefore, for any particular purpose, the ester which gives the most desirable properties for the particular use in mind can be selected.

Dimethoxy ethyl phthalate (Methox) is preferably used as an active solvent in my improved compositions for the acetate since it has been found the most suitable of the large number of commercial solvent plasticizers for starch acetate which are available commercially. Other satisfactory solvents are the solvent glycolates, solvent esters or ethers of comparatively high boiling points, and the like.

As latent solvents, I preferably use diphenyl phthalate, diamyl phthalate, or mixtures of them, as these are the most satisfactory substances I have found commercially available for this purpose.

To prevent two surfaces having coatings of the composition of my invention from "blocking" or welding together, I preferably use a diluent or diluents which prevent blocking up to temperatures of 140° F., so that the coating compositions of my invention will not block at the maximum temperatures to which they may be subjected during hot weather shipping conditions and the like. Any of a group or combination of materials may be used as diluents such as chlorinated diphenyl resin, hydrogenated ethyl abietate, and the like, as the diluents to effectively prevent tackiness and "blocking," as long as the mixture is a true solution at the temperature of application.

The relative proportions of active solvent and latent solvents or diluents in my improved compositions for coating paper must be carefully selected to provide a balancing action in the solutions so that the compositions will be easily runable at about 240° F. to 260° F. and will not block up to 140° F.

The starch acetate product employed in my preferred compositions is soluble in the active solvent at substantially all normal temperatures. As the composition becomes hotter, in preparation for application as a coating, the latent solvents or diluents apparently join the active solvent to complete the solution and thin it, thereby reducing its viscosity and rendering it workable.

Provision of such latent solvents and diluents which dissolve the acetate only at high temperatures solves a problem which has long vexed the prior art wherein only active solvents in large quantity were employed. Such active solvents caused the compositions to block at low temperatures such as 140 F.

*Example I.*—By way of specific example a preferred embodiment of a desirable paper surface coating composition embodying my invention comprises:

| | Percent |
|---|---|
| Ester (starch acetate product having combined acetic acid content of from 62% to 65%) | 60 |
| Dimethoxy ethyl phthalate (commercially known at "Methox") | 10 |
| Chlorinated diphenyl resin (commercially known as #1262 Aroclors Monsanto) | 15 |
| Diphenyl phthalate | 10 |
| Diamyl phthalate | 5 |
| | 100 |

Very thin, tough, stable, substantially colorless, highly glossy, flexible, water-proof coatings and transparent films which are resistant and chemically inert to oils, greases and foodstuffs and which are closely bonded to the paper surface, when thermoplastically applied, are formed by compositions of the foregoing example. My improved compositions may be tinted with ease by adding suitable coloring matter, and may be employed for coating preservative wrapping paper for foodstuffs and the like. Moreover, they do not deteriorate substantially with age, and in very thin coatings do not crack or peel even when the paper to which they are applied is wrinkled.

Such compositions are workable at high speeds at 250° F. and will not "block" at 140° F. so that paper to which they are applied need not be subjected to injurious drying or burning during coating operations, but retains its physical properties substantially intact after coating.

It will be understood by those skilled in the art that the proportions of base solvents and diluents are widely variable to produce coating compositions of differing properties and characteristics adapted for various uses, such as impregnation of cloth, manufacture of films, laminating compositions and the like.

*Example II.*—By way of further example, a modified composition in accordance with my invention which will block at approximately 132° F., but not at approximately 130° F., comprises the following ingredients and proportions:

| | Percent |
|---|---|
| Ester (starch acetate product having combined acetic acid content of from 62% to 65%) | 60 |
| Dimethoxy ethyl phthalate (Methox) | 15 |
| Chlorinated diphenyl resin (#1262 aroclors Monsanto) | 10 |
| Diphenyl phthalate | 10 |
| Diamyl phthalate | 5 |
| | 100 |

*Example III.*—A composition useful as a laminating adhesive for foil and paper comprises the following ingredient and proportions:

| | Percent |
|---|---|
| Ester (starch acetate product having combined acetic acid content of from 62% to 65%) | 60 |
| "Zein" (corn protein product) | 10 |
| "#9 Santisizer" Monsanto (mixture of ortho and para toluene sulfoamides) | 30 |
| | 100 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A normally solid thermoplastic coating composition comprising approximately 60 percent of a normally solid acetylation product of starch having a melting point between 245° F. and 325° F., approximately 15 percent chlorinated diphenyl resin as a diluent, and the remaining 25 percent consisting of a balanced proportion of active and latent solvent plasticizers containing at least 10 percent dimethoxy ethyl phthalate as an active solvent plasticizer and at least 10 percent diphenyl phthalate as a latent solvent plasticizer.

2. A thermoplastic coating and film forming composition, which is solid and non-tacky at temperatures below approximately 140° F. comprising a normally solid acetylation product of a material selected from the group consisting of dextrin and starch having a melting point between 237° F. and 355° F., and a high boiling point solvent plasticizer for said product.

3. A thermoplastic coating and film forming composition which is solid within the range of temperatures encountered during normal room and shipping conditions comprising a mixture containing a normally solid acetylation product of a material selected from the group consisting of dextrin and starch having a melting point between 237° F. and 335° F.; a high boiling point active solvent plasticizer in which said product is in solution within said temperature range; and a compatible latent solvent plasticizer which becomes an active solvent for said product only at temperatures appreciably above said range and so lowers the viscosity of the solution to a flowable state at said higher temperatures.

4. A thermoplastic coating and film forming composition which is solid within the range of temperatures encountered during normal room and shipping conditions comprising a mixture containing a normally solid acetylation product of starch having a boiling point between 245° F. and 335° F.; a high boiling point active solvent plasticizer in which said product is in solution within said temperature range; and a compatible latent solvent plasticizer selected from the group consisting of those solvent plasticizers which become active solvents for said product only at temperatures appreciably above said range.

5. The thermoplastic composition defined in claim 4, wherein said latent solvent plasticizer is mainly diphenyl phthalate.

6. A thermoplastic coating and film forming composition which is solid within the range of temperatures encountered in normal room and shipping conditions comprising a mixture containing in solid solution a normally solid acetylation product of starch having a melting point between 245° F. and 335° F.; a high boiling point active solvent plasticizer in which said product is soluble within said temperature range; a compatible latent solvent plasticizer which becomes an active solvent for said product only at temperatures higher than said range; and a diluent which is active to promote runnability of the composition at temperatures high enough to render the composition workable.

7. A thermoplastic coating and film forming composition which is solid within the range of temperatures encountered in normal room and shipping conditions comprising a mixture of a normally solid acetylation product of a material selected from the group consisting of dextrin and starch having a melting point between 237° F. and 355° F.; and a balanced proportion of compatible latent and active solvent plasticizers effective to maintain the composition solid and non-tacky at normal room temperatures and up to approximately 140° F., but active to render the composition sufficiently runnable for efficiently coating paper and like surfaces between approximately 240° F. and 300° F.

8. A thermoplastic coating and film forming composition which is solid within the range of temperatures encountered in normal room and shipping conditions comprising a mixture of a normally solid acetylation product of starch having a melting point between 245° F. and 325° F.; and a balanced proportion of compatible latent and active solvent plasticizers effective to maintain the composition solid and non-tacky at normal room temperatures and up to approximately 140° F., but active to render the composition sufficiently runnable for efficiently coating paper and like surfaces between approximately 240° F. and 300° F.

9. A thermoplastic coating and film forming composition which is solid within the range of temperatures encountered during normal room and shipping conditions comprising a mixture containing a normally solid acetylation product of a material selected from the group consisting of starch and dextrin having a melting point between 237° F. and 335° F.; a high boiling point solvent plasticizer in which said product is in solution within said temperature range; and a compatible latent solvent plasticizer, selected from the group consisting of diphenyl phthalate and diamyl phthalate, which becomes an active solvent for said product only at temperatures appreciably above said range.

JOHN D. MURRAY.